Oct. 15, 1935.　　　J. F. WERDER　　　2,017,362
HOSE COUPLING
Filed April 12, 1933
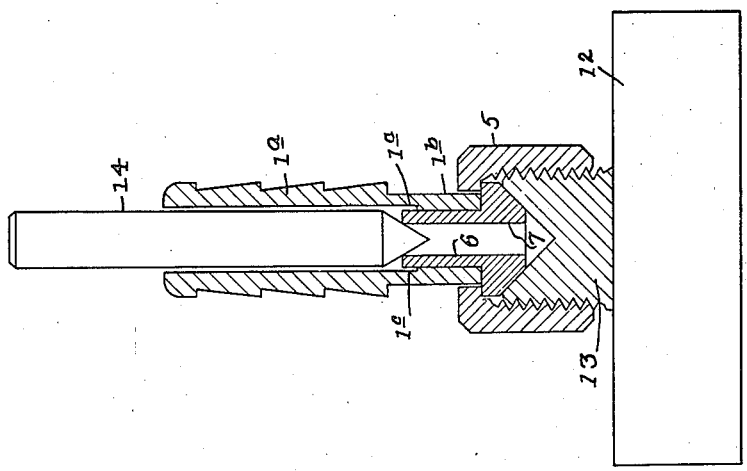
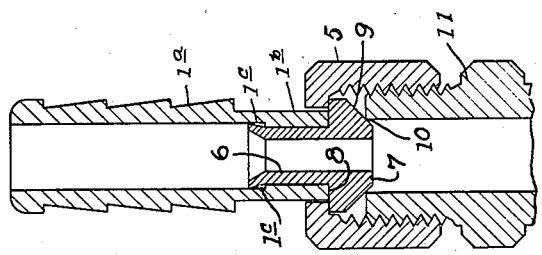
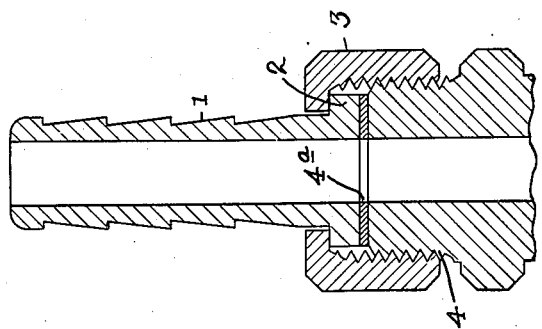
INVENTOR
JOHN F. WERDER.
ATTORNEYS.

Patented Oct. 15, 1935

2,017,362

UNITED STATES PATENT OFFICE 2,017,362

HOSE COUPLING

John F. Werder, Lakewood, Ohio, assignor of one-half to Edmund Rogers, South Euclid, Ohio Application April 12, 1933, Serial No. 665,736

2 Claims. (Cl. 285—120)

This invention relates to an improved form of hose coupling and the method of making the same.

In the old and well known form of hose coupling, as illustrated in Fig. 1 of the accompanying drawing, the hose-attaching element 1, which is adapted to receive the end portion of the hose, is provided with an annular flange 2 which is adapted to be engaged by the inside marginal portion of the opening in the head of the nut 3 through which the main body of the hose-attaching element 1 is adapted to be extended upon assembling the parts. The nut 3 is adapted for screw-thread engagement with the other attaching element 4 to which another section of hose may be attached or which may constitute a nozzle for discharge or filling purposes. Between the flange 2 and the end of attaching element 4, there is provided the gasket 4ª for sealing this connection.

With this old conventional form of coupling, it is obvious that the opening in the head of the nut 3 must be of sufficient size to permit extension of the hose-attaching element 1 therethrough and the main body of the nut 3 must accordingly be of comparatively large size. Not only do such large proportions in these elements require a correspondingly large quantity of material but under some circumstances, such comparatively large parts are objectionable from the standpoint of appearance.

The object of the present invention therefore is to provide a hose coupling in which the nut and attaching element to which the nut is threaded may be of reduced proportions for the sake of economy of material as well as appearance, while at the same time there may be maintained the same standard or conventional size of hose-attaching element corresponding to that indicated by reference numeral 1 in Fig. 1 of the accompanying drawing.

Another object consists in devising a convenient and efficient method of assembling and securing together the several parts involved in my new form of hose coupling in which some of the parts are of comparatively reduced proportions, as above referred to.

Another object consists in devising such a hose coupling with some of the parts of reduced proportions and in which at the same time there is insured an effective sealing engagement between the component parts of the coupling.

Other objects will appear from the following description and claims when considered together with the accompanying drawing.

Fig. 1 is a sectional view illustrating the old and familiar form of hose coupling upon which my present invention is an improvement;

Fig. 2 is a sectional view illustrating my improved form of hose coupling with the parts in complete assembly; and Fig. 3 is a view mostly in section illustrating the method of assembling the several parts of my improved form of coupling.

It is to be understood that the present disclosure is merely for purposes of illustration and that other modifications and variations may be made without departing from the spirit of the present invention as set forth and claimed.

As indicated in Fig. 2, it will be observed that the outside of the main body of the hose-attaching element 1ª of my improved form of coupling is of the same diameter as the old conventional form 1 illustrated in Fig. 1, and that the inner diameter thereof is for the most part also of the same size as that of the old conventional form. However, in my present improved form of coupling, the attaching element 1ª is provided with a plain end portion 1ᵇ which is of a slightly smaller diameter than that of the opening in the nut 5 which in my present invention is of a substantially reduced size. It will be observed also that the outside diameter of the main body portion of the hose-attaching element 1ª in the present case is greater than that of the opening in the nut 5. For this reason, as will be apparent, the nut 5 of reduced size could not be employed in connection with the old form of hose-attaching element 1 since the element 1 could not be extended through the reduced size of opening in the nut in order to assemble these parts.

As a means of enabling the reduced size of nut 5 to be assembled with the hose-attaching element 1ª, I have provided an intermediate connecting member which has a neck portion 6 which in the present form of illustration extends upon the inside of the end portion 1ᵇ of the hose-attaching element. In this connection, it should be observed that the portion 1ᵇ of the hose-attaching element is formed with a restricted throat which terminates in the shoulder 1ᶜ. This shoulder 1ᶜ is adapted to have the end portion of the neck 6 forced into locking engagement therewith, as indicated in Fig. 2, for the purpose of securing these parts in permanent assembly. The neck 6 has a press fit with the throat of the hose-attaching element so as to insure a sealed connection between these parts.

The intermediate connecting member is provided at its other end with an enlarged head 7 which has a squared shoulder 8 adapted for engagement with the end of the reduced portion 1b of the hose-attaching element and for engagement also by the inside marginal portion of the opening through the nut 5 for coupling engagement. The head portion 7 is provided with a frusto-conical portion 9 which is adapted for seating and sealing engagement with the annular edge 10 at the end of the attaching element 11. The attaching element 11 has screw-thread engagement with the nut 5.

It will be observed that the diameter of the passage through the main part of the hose-attaching element 1a is the same as that of the passage through the other attaching element 11 but that, as before explained, the inner diameter of the restricted throat through the reduced portion 1b is of smaller diameter. However, with the frusto-conical seat 9 provided upon the head of the intermediate connecting member 7, there is afforded an effective seating and sealing engagement since the extended surface 9 compensates for the offset or lack of registry between the inner walls of the passages through the restricted portion 1b and the other attaching element 11.

Preferably, the several elements comprising my improved form of hose coupling will be formed of brass, although any other suitable form of metal might be employed, and according to my invention, there is provided a line-contact engagement between the edge 10 and the frusto-conical surface 9 which, by virtue of the brass or other semi-soft metal employed, results in the formation of what might be regarded as a valve seating engagement between these parts. That is, the nature of the material employed will permit the parts to find or form their own true seat as they are drawn together for sealing engagement. According to the principle of my invention, it is essential that at least one of the two parts which constitute this line-contact engagement be formed of semi-soft metal, although both of them may be formed of such metal. With this form of seating and sealing engagement, it will be seen that I have eliminated the necessity for any gasket or other such sealing means as is usually employed.

It will be understood that when the parts have been assembled in the manner explained, the nut 5 will be retained upon the restricted portion 1b since the opening through the nut 5 is smaller than the main body of the hose-attaching element 1a and the head portion 7 of the intermediate connecting member. Thus, the several parts are in permanent assembly and when it is desired to attach this assembly to the other attaching element 11, this is accomplished in the familiar manner by merely screwing the nut 5 upon the threaded end portion of the element 11, this engaging action being continued until there is obtained a proper sealing engagement between the frusto-conical seat 9 and the edge 10 of the attaching element 11.

The method of original assembly of the several parts of my improved hose coupling will now be briefly described with particular reference to Fig. 3 of the drawing. In the first place, the reduced end portion 1b of the hose-attaching element is inserted into the opening of the nut 5 and then the intermediate connecting member is applied thereto by extending the neck portion 6 thereof with a press fit into the inside of the restricted portion 1b. As one means for facilitating the engagement of these parts, there may be employed the anvil 12 which has formed as an integral part thereof the screw-threaded projection 13, the top of the projection 13 being formed with a conical-shaped seat corresponding to the frusto-conical surface 9 of the member 7. Thus, by supporting the intermediate connecting member upon the anvil in the manner indicated in Fig. 3, the hose-attaching element 1a may be driven into engagement therewith so as to provide a press fit between these members as already referred to. Then, upon applying the tool 14 in the manner indicated in Fig. 3, with its conical end portion in engagement within the neck portion 6 of the member 7, the end portion of the neck 6 can be forced into engagement over the shoulder 1c by application of a hammer or the like to the upper end of the tool 14, as will be readily understood. Then, upon removal of the tool 14 and removal of the nut 5 from the anvil, the assembly is complete.

As above explained, my present invention makes possible a saving in the cost of material required which means a saving to the ultimate user. Also, as above suggested, my improved form of hose coupling contributes a much more satisfactory appearance especially to certain installations in which such a coupling may be required and in which the matter of appearance is a material consideration.

At the same time, there is obtained with my hose coupling an effective sealing engagement between the parts without the employment of any gasket or other sealing means, and there is afforded a free flow through my improved coupling. Since the restricted passage through the intermediate connecting member is of only comparatively short extent, such restriction will not interfere with the flow of the fluid therethrough. Thus, while preserving all the essential requirements of an efficient hose coupling, I have made it possible to reduce the cost of material employed and have also contributed to the general appearance of the coupling.

Other advantages resulting from this invention will readily suggest themselves to those who are skilled in the art to which it relates.

What I claim is:

1. A hose coupling comprising a hose-attaching element of a given size, a nut having an opening smaller than the diameter of the main body of said element, said element having a reduced end portion adapted to be received within the opening of the nut and having an annular shoulder upon its inner surface, a separate intermediate connecting means having a neck of smaller diameter than that of the nut opening and having a press fit engagement with the inside of the reduced end portion of said element, the end of said neck having locking engagement with said shoulder so as to maintain the parts in secure assembly, said intermediate connecting means having a head of larger diameter than that of the nut opening so as to be engaged by the marginal portion of the nut opening for coupling action therewith, and a companion attaching element adapted for coupling engagement by said nut and with the head of said intermediate connecting means.

2. A hose coupling comprising a hose-attaching element of a given size, a nut having an opening smaller than the diameter of the main body of said element, said element having a reduced end portion adapted to be received within the opening of the nut, and having its end portion formed with a restricted throat terminating inwardly with an annular shoulder, a separate intermediate connecting means having a neck of smaller diameter than that of the nut opening and affixed to the interior of said throat and having locking engagement with said shoulder, said intermediate connecting means having a head of larger diameter than that of the nut opening so as to be engaged by the inside marginal portion of the nut opening for coupling action therewith, and a companion attaching element adapted for coupling engagement by said nut and having an annular edge at the end thereof of the same diameter as the interior of the main part of said first-named hose-attaching element, and said head having a frusto-conical surface for engagement with said annular edge so as to form a line contact engagement, at least one of the parts forming such line contact engagement consisting of semi-soft metal so as to produce an effective seal.

JOHN F. WERDER.